US010745138B2

(12) United States Patent
Connell et al.

(10) Patent No.: US 10,745,138 B2
(45) Date of Patent: Aug. 18, 2020

(54) AIR DRYING SYSTEM AND METHOD THEREFOR

(71) Applicant: The Boeing Company, Chicago, IL (US)

(72) Inventors: William John Connell, Woodinville, WA (US); Cameron Lindsay Carnegie, Everett, WA (US); Marcus Karel Richardson, Everett, WA (US)

(73) Assignee: The Boeing Company, Chicago, IL (US)

( * ) Notice: Subject to any disclaimer, the term of this patent is extended or adjusted under 35 U.S.C. 154(b) by 75 days.

(21) Appl. No.: 15/934,233

(22) Filed: Mar. 23, 2018

(65) Prior Publication Data

US 2019/0291873 A1    Sep. 26, 2019

(51) Int. Cl.
*B64D 13/06*      (2006.01)
*B64C 1/06*       (2006.01)
*F24F 3/14*       (2006.01)

(52) U.S. Cl.
CPC .............. *B64D 13/06* (2013.01); *B64C 1/067* (2013.01); *B64D 2013/0644* (2013.01);
(Continued)

(58) Field of Classification Search
CPC .................... B64C 1/067; B64D 13/06; B64D 2013/0648; B64D 2013/0644;
(Continued)

(56) References Cited

U.S. PATENT DOCUMENTS 3,258,925 A * 7/1966 Barthelemy .............. F02C 1/10
                                                           60/649
5,461,882 A * 10/1995 Zywiak .............. B60H 1/00007
                                                           62/401
(Continued)

FOREIGN PATENT DOCUMENTS

EP        3235729          10/2017
EP        3235729 A1  * 10/2017 ......... B60H 1/00428
(Continued)

OTHER PUBLICATIONS

European Search Report dated Jun. 11, 2019; European Application No. 19160645.
(Continued)

*Primary Examiner* — Frantz F Jules
*Assistant Examiner* — Martha Tadesse
(74) *Attorney, Agent, or Firm* — Perman & Green LLP

(57) ABSTRACT

An air drying system including a compressor coupled to a first air inlet through which moist air is received, a first turbine in fluid communication with the compressor and coupled to a first air outlet through which dry air is expelled, and a second turbine coupled to a second air inlet and a second air outlet and being driven, at least in part, by an air flow caused by a pressure differential between the second air inlet and the second air outlet, where the second turbine is operably coupled to the compressor and the first turbine by a drive mechanism so that rotation of the second turbine drives rotation of the compressor and the first turbine.

20 Claims, 4 Drawing Sheets

(52) U.S. Cl.
CPC ............... *B64D 2013/0648* (2013.01); *B64D 2013/0662* (2013.01); *F24F 2003/144* (2013.01)

(58) Field of Classification Search
CPC ..... B64D 2013/0688; B64D 2013/0662; F24F 2003/144; Y02T 50/56; Y02T 50/54; B60H 1/00007; F05B 2220/50; F25B 9/004
See application file for complete search history.

(56) References Cited

U.S. PATENT DOCUMENTS

| | | | |
|---|---|---|---|
| 6,491,254 B1 | 12/2002 | Walkinshaw et al. | |
| 2003/0126880 A1* | 7/2003 | Zywiak | B64D 13/06 62/402 |
| 2004/0195447 A1* | 10/2004 | Claeys | B64D 13/06 244/118.5 |
| 2008/0110193 A1* | 5/2008 | Jonqueres | B64D 13/06 62/331 |
| 2011/0296870 A1* | 12/2011 | Brostmeyer | B01D 53/002 62/619 |
| 2012/0279228 A1* | 11/2012 | Ferra | F01D 25/183 60/772 |
| 2016/0231031 A1* | 8/2016 | Bruno | B64D 13/06 |
| 2017/0305560 A1 | 10/2017 | Bruno | |

FOREIGN PATENT DOCUMENTS

| | | | |
|---|---|---|---|
| EP | 3235730 | 10/2017 | |
| EP | 3235730 A1 * | 10/2017 | ............. B64D 13/06 |

OTHER PUBLICATIONS

CTT Systems, "Humidity in Balance", http://www.ctt.se/cair/how-it-works-2/; Jan. 30, 2018.

* cited by examiner

AIR DRYING SYSTEM AND METHOD THEREFOR

BACKGROUND

1. Field

The exemplary embodiments generally relate to air drying systems and more particularly to aircraft air drying systems.

2. Brief Description of Related Developments

Generally, moisture creation has been reported on commercial aircraft for many years. The moisture creation may result from water vapor in a crown area of the aircraft condensing on the cold structure and on equipment inboard and outboard of aircraft insulation ("collectively cold surfaces") during, for example, a cruise segment of a flight (although water vapor may condense during other segments of a flight). The condensed water vapor may freeze on the cold surfaces and melt during descent and landing of the aircraft. The melted and condensed water vapor, now in the form of water droplets (referred to generally as "rain in the plane"), may migrate throughout the aircraft to areas such as the cabin area, aircraft equipment areas, and/or the aircraft insulation areas. The water droplets created from the freeze/thaw cycle of the crown area moist air may reduce an operational life of aircraft components, reduce passenger comfort, and increase the weight of aircraft insulation (which may increase fuel, maintenance, and other operational costs).

Conventionally, water vapor has been removed from the air within the aircraft or insulation has been dried using, for example, zonal dryers and crown ventilation. The zonal dryers receive moist air from the crown area and pass the moist air through desiccant wheels where the dried air is then deposited back into the crown area. Crown ventilation directs dry air from cabin air conditioning packs into the crown area. Both of these air drying methods are intended to dry the air in the crown area but may not reduce moisture accumulation on the cold surfaces of the aircraft which may result in the formation of water droplets on descent and landing of the aircraft. Further, these above-mentioned air drying methods may only dry out wetted aircraft insulation and may not reduce the likelihood of water vapor condensation and the freezing and thawing cycle mentioned above.

SUMMARY

Accordingly, apparatuses and methods, intended to address at least one or more of the above-identified concerns, would find utility.

The following is a non-exhaustive list of examples, which may or may not be claimed, of the subject matter according to the present disclosure.

One example of the subject matter according to the present disclosure relates to an air drying system comprising: a compressor coupled to a first air inlet through which moist air is received; a first turbine in fluid communication with the compressor and coupled to a first air outlet through which dry air is expelled; and a second turbine coupled to a second air inlet and a second air outlet and being driven, at least in part, by an air flow caused by a pressure differential between the second air inlet and the second air outlet; wherein the second turbine is operably coupled to the compressor and the first turbine by a drive mechanism so that rotation of the second turbine drives rotation of the compressor and the first turbine.

Another example of the subject matter according to the present disclosure relates to an aircraft comprising: a frame forming a cabin area including a crown area and an insulative area, the insulative area being disposed at least between the crown area and an exterior skin coupled to the frame; and an air drying system coupled to the frame, the air drying system including a compressor having an inlet coupled to a first air inlet disposed so as to receive moist air from the crown area; a first turbine in fluid communication with the compressor and coupled to a first air outlet through which dry air is expelled into one or more of the crown area and insulative area; and a second turbine coupled to a second air inlet and a second air outlet, the second air inlet being disposed so as to receive air from the cabin area and the second air outlet being disposed so as to expel air to an exterior of the aircraft, the second turbine being driven, at least in part, by an air flow caused by a pressure differential between the second air inlet and the second air outlet; wherein the second turbine is operably coupled to the compressor and the first turbine by a drive mechanism so that rotation of the second turbine drives rotation of the compressor and the first turbine.

Still another example of the subject matter according to the present disclosure relates to a method for drying air, the method comprising: receiving, through a first air inlet, moist air into a compressor; expelling dry air from a first turbine, through a first air outlet, where the first turbine is in fluid communication with the compressor; driving, at least in part, a second turbine with an air flow caused by a pressure differential between a second air inlet and a second air outlet, the second air inlet and the second air outlet being coupled to the second turbine; and driving, at least in part, through a drive mechanism, rotation of the compressor and the first turbine with rotation of the second turbine.

BRIEF DESCRIPTION OF THE DRAWINGS

Figure 1:
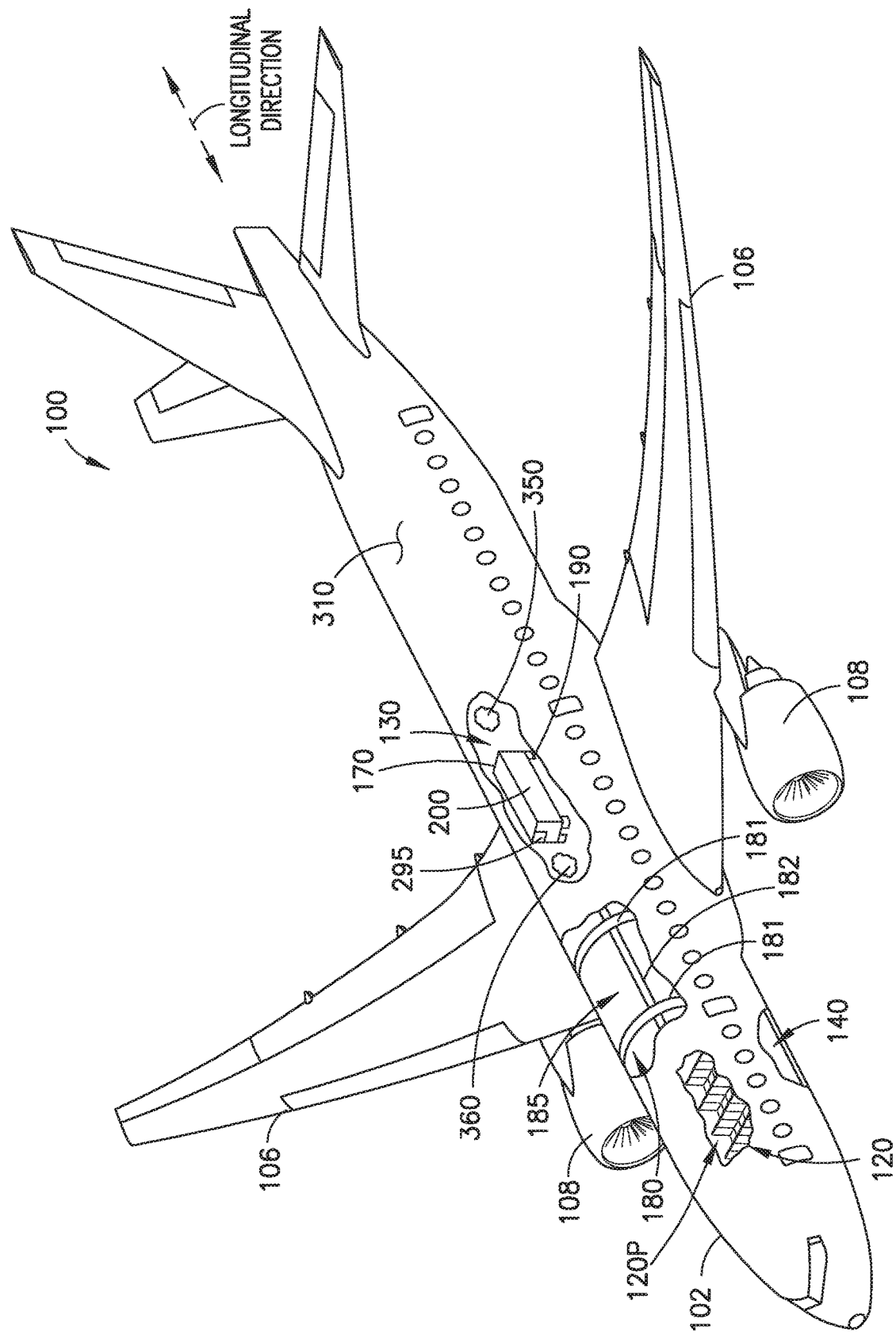
Figure 2:
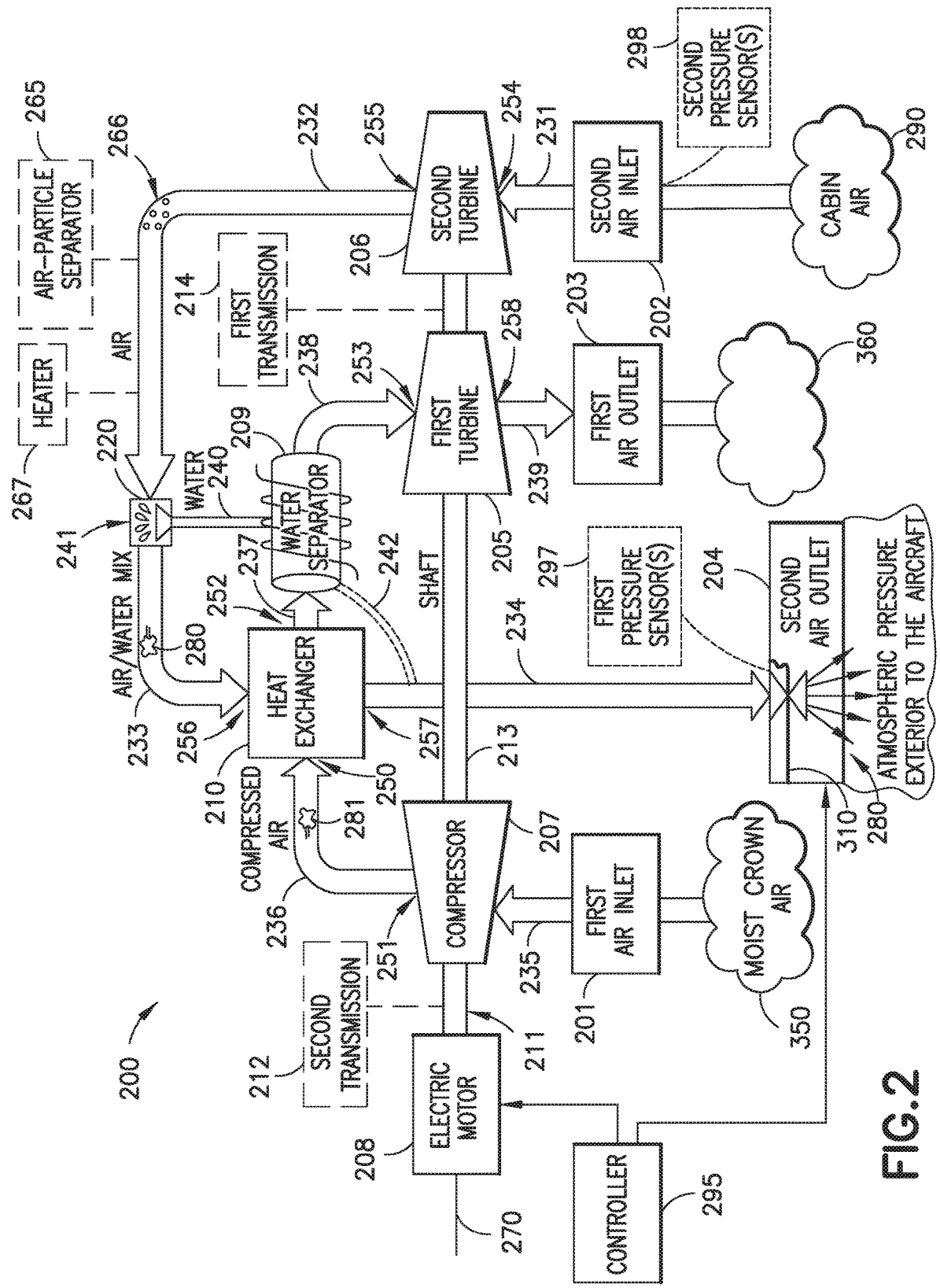
Figure 3:
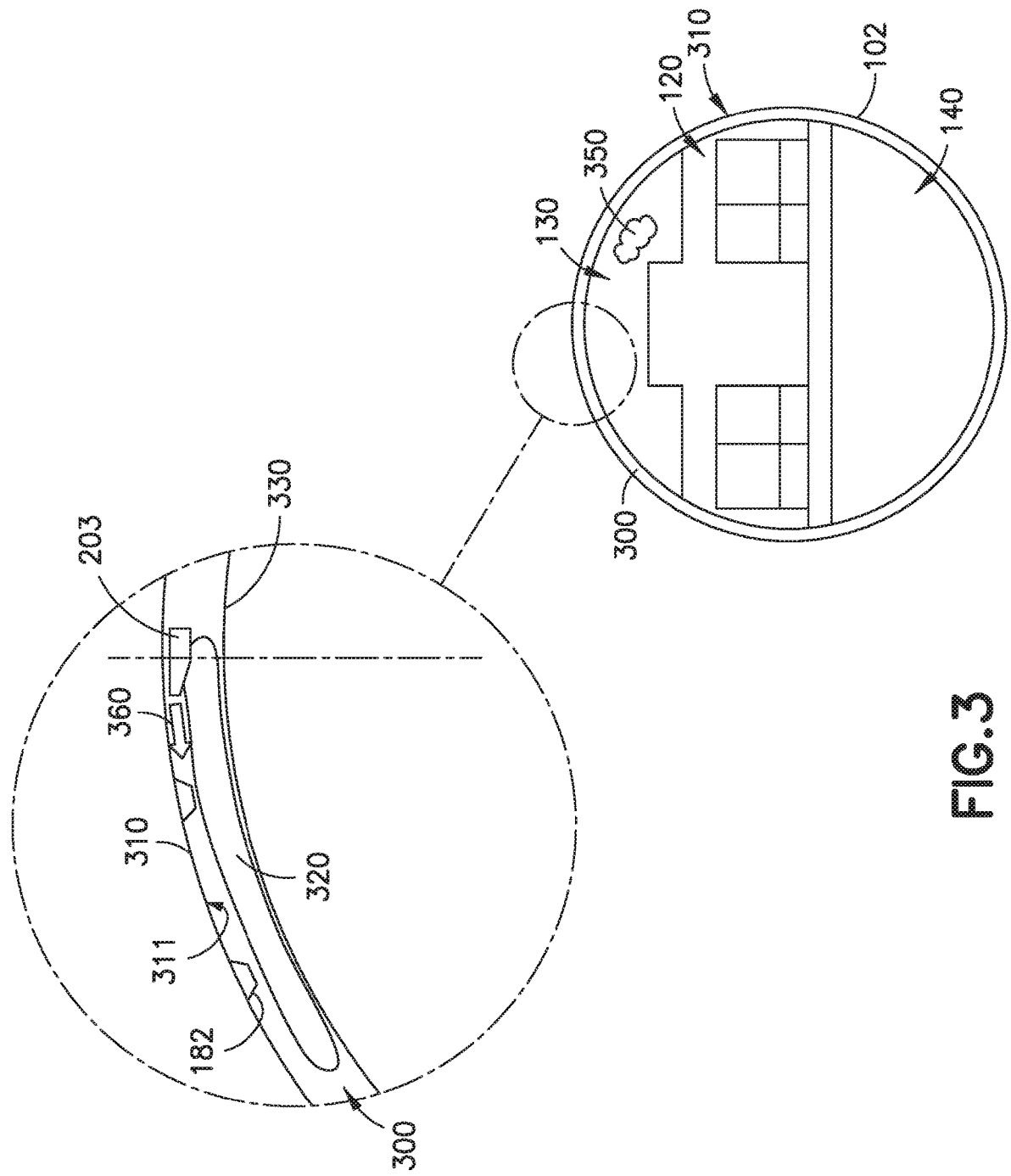
Figure 4:
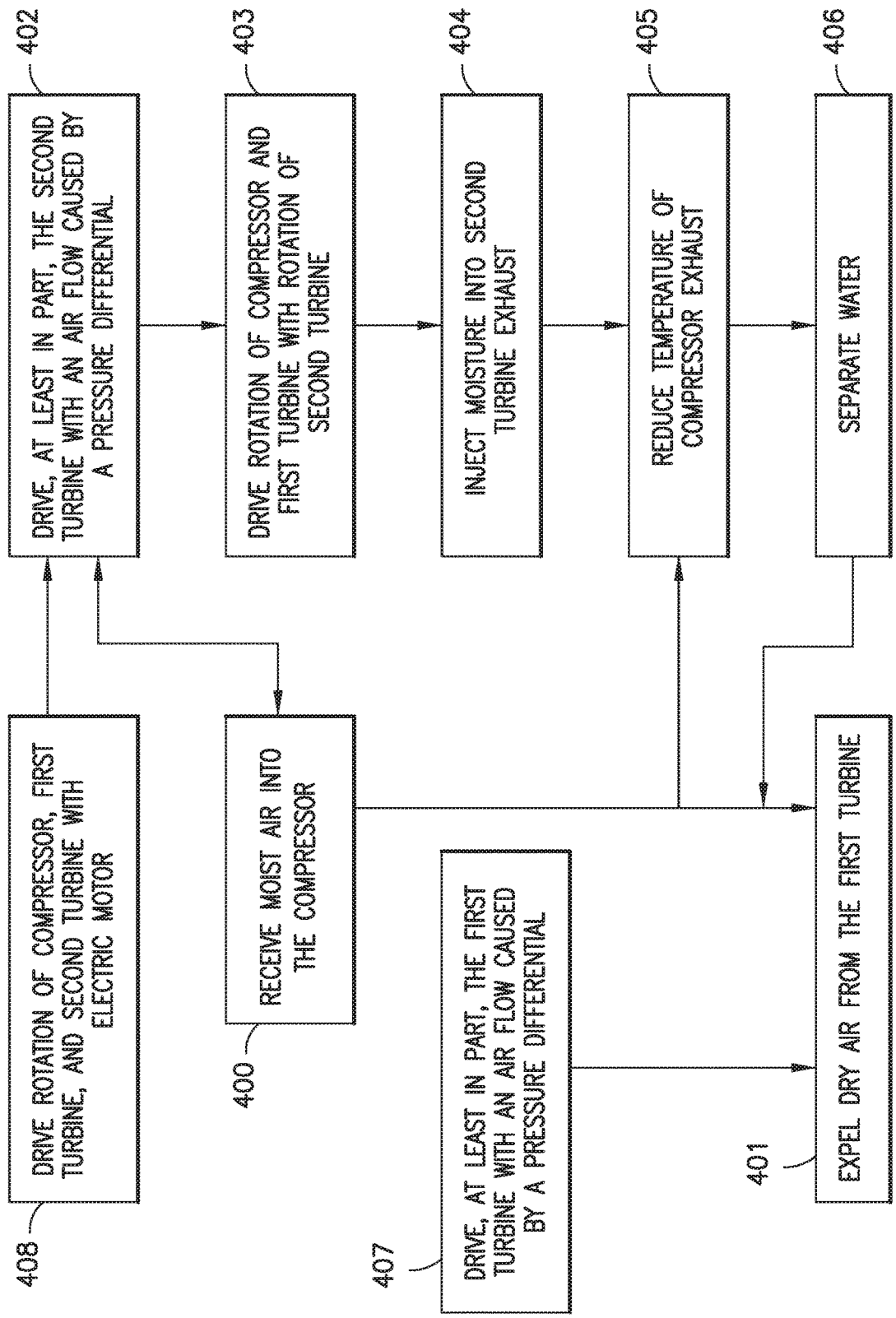

Having thus described examples of the present disclosure in general terms, reference will now be made to the accompanying drawings, which are not necessarily drawn to scale, and wherein like reference characters designate the same or similar parts throughout the several views, and wherein:

FIG. 1 is a schematic isometric illustration of an aircraft in accordance with aspects of the present disclosure;

FIG. 2 is a schematic block diagram illustration of an air drying system in accordance with aspects of the present disclosure;

FIG. 3 is a schematic cross sectional illustration of a portion of the aircraft of FIG. 1 in accordance with aspects of the present disclosure; and FIG. 4 is an exemplary flow chart of an air drying method in accordance with aspects of the present disclosure.

DETAILED DESCRIPTION

Referring to FIGS. 1 and 2, the aspects of the present disclosure may provide for an aircraft moisture control architecture that is improved over the conventional zonal dryers and crown ventilation systems noted above. For example, the present disclosure provides an air drying system 200 (which may be referred to as a "Turbo Dryer" due to the inclusion of turbines in the air drying system 200) that receives moist air 350 from an aircraft's 100 crown area 130 and passes the moist air 350 through a compressor 207, heat exchanger 210, water separator 209, and a first turbine 205 to provide dry air 360 back into, at least, the crown area 130. The air drying system 200 is powered during, for example, cruise flight of the aircraft 100, at least in part, by a second turbine 206 that is driven by a flow of cabin air 290 from, for example, the cabin area 120 and/or any other portion of the pressurized compartment of the aircraft 100 (for convenience the entire pressurized compartment of the aircraft is generally referred to as the cabin area 120). The second turbine exhaust 280 of the second turbine 206 exits the aircraft 100 to an atmospheric pressure external to the aircraft 100, where the atmospheric pressure is a pressure corresponding to, for example, cruise altitudes. In accordance with the aspects of the present disclosure, the flow of cabin air 290 from, for example, the cabin area 120 that drives the second turbine 206 is caused by a pressure differential between an air pressure of the cabin air 290 and the air pressure external to the aircraft 100). The operation of the second turbine 206 may provide for energy harvesting and reduced or zero power requirements for powering the air drying system 200 during, for example, cruise flight (or at altitudes that provide a sufficient pressure differential to drive the second turbine 206). When the aircraft 100 is, for example, on the ground, the air drying system 200 may be powered by any suitable motor, such as an electric motor 208. During climb and descent of the aircraft 100 from cruising altitudes, the electric motor 208 may also partially drive the second turbine 206 (and the other rotary components of the air drying system). As an example of the above, the first turbine 205 drives the drive mechanism 211 in concert with the second turbine 206 and/or the electric motor 208 so that the drive mechanism 211, in turn, drives the compressor 207.

The air drying system 200 may produce the dry air 360 (FIG. 3) in sufficient volume flow rates to reduce or eliminate water vapor condensation within the aircraft 100. In one aspect, the volume flow rate of the air drying system 200 is about 8 cubic feet (or more) per minute (CFM) (e.g., about 13.5 cubic meters per hour) or more per aircraft 100 frame bay 185. In other aspects, the volume flow rate may be less than about 8 CFM and may depend on dimensions of the frame bay(s). It is noted that each frame bay 185 comprises the area disposed between longitudinally spaced frame members 181 of the aircraft 100 frame 180. The dry air 360 produced by the air drying system 200 may be injected, for example, between aircraft insulation 320 (FIG. 3) and an inner surface 311 (FIG. 3) of an exterior skin 310 (FIG. 3) or at any other suitable location of the aircraft 100 to displace the moist air 350 in the crown area 130 (or other suitable portions of the aircraft 100) that would otherwise exist adjacent the exterior skin 310. The air drying system 200, and the dry air 360 produced thereby, may reduce or otherwise substantially eliminate water vapor condensation at least in crown area 130 of the aircraft 100, reduce moisture absorbed by the aircraft insulation 320 (FIG. 3), and reduce or substantially eliminate the effects of water vapor condensation on the interior of the aircraft 100.

Illustrative, non-exhaustive examples, which may or may not be claimed, of the subject matter according to the present disclosure are provided below.

Still referring to FIG. 1, the aircraft 100 is illustrated as a fixed wing aircraft having a frame 180, wings 106, and engines 108. The frame 180 includes longitudinally spaced frame members 181 and stringers 182 that form, with an exterior skin 310 of the aircraft 100, a fuselage 102. The fuselage 102 has a cabin area 120 that includes a crown area 130, and a cargo/bilge area 140. In other aspects, the aircraft 100 may be any suitable fixed wing and/or rotary wing aircraft. In one aspect, the air drying system 200 may be coupled to the frame 180 of the aircraft 100 and be disposed in, for example, the crown area 130 of the aircraft 100. In other aspects, the air drying system 200 may be disposed in any suitable area of the aircraft, such as in the cargo/bilge area 140 or any aircraft equipment storage area. In one aspect, the air drying system 200 may be in the form of an air drying pack 170 such that at least the rotary components (e.g., the compressor 207, the first turbine 205, and the second turbine 206—see FIG. 2), the heat exchanger 210 (FIG. 2) and the water separator 209 (FIG. 2) of the air drying system 200 are coupled to the frame 180 as a modular unit. There may be one or more air drying packs 170 disposed in a single aircraft 100. In other aspects, one or more of the air drying system 200 components may be individually coupled to the frame independent of other air drying system 200 components, where the rotary components are drivingly coupled to each other in any suitable manner (e.g., in drive mechanism communication or coupled to each other by a drive mechanism 211) and suitable conduits 235, 236, 237, 238, 239, 231, 232, 233, 234 (noting that the arrows integrated into the conduits in FIG. 2 illustrate a direction of fluid flow through the air drying system 200) are provided so that the air drying system 200 components are in fluid communication with one another to dry the air as described herein.

The air drying system 200 may be coupled to the frame 180 in any suitable manner. For example, one or more vibration isolators 190 may be disposed between the air drying system 200 and the frame 180 so as to substantially prevent or eliminate vibrations that would otherwise be induced to the frame 180 from the air drying system 200. The vibration isolation of the air drying system 200 may also reduce the perception of (or transfer of) air drying system 200 operational noise to, for example, at least a passenger seating area 120P of the cabin area 120.

Referring to FIGS. 1 and 2, the air drying system 200 includes the compressor 207, the heat exchanger 210, the water separator 209, a first turbine 205, a second turbine 206, and the electric motor 208. A first air inlet 201 may be in fluid communication with an interior of the crown area 130. The compressor 207 is coupled to the first air inlet 201, such as through any suitable conduit 235, where moist air 350 from the crown area 130 is received into the compressor 207 through the first air inlet 201.

The first turbine 205 is in fluid communication with the compressor 207 for receiving compressed air from the compressor 207. For example, the heat exchanger 210 includes a first heat exchanger inlet 250 coupled to an outlet 251 of the compressor 207 in any suitable manner, such as through conduit 236. The water separator 209 is coupled to a first heat exchanger outlet 252 of the heat exchanger 210 and to an inlet 253 of the first turbine 205 in any suitable manner, such as through conduits 237, 238. Here, the first turbine 205 is in fluid communication with the compressor 207 through the heat exchanger 210 and water separator 209. An outlet 258 of the first turbine 205 is coupled to a first air outlet 203 in any suitable manner, such as through conduit 239. The first air outlet 203 may be disposed in any suitable area of the aircraft 100, such as in an insulative area 300 (FIG. 3) of the aircraft 100, where dry air 360 from the first turbine 205 is expelled from the first air outlet 203.

A second air inlet 202 may be disposed within the cabin area 120 of the aircraft 100 so as to receive the cabin air 290. An inlet 254 of the second turbine 206 is coupled to the second air inlet 202 in any suitable manner, such as through conduit 231. An outlet 255 of the second turbine 206 is in fluid communication with a second air outlet 204 that expels second turbine exhaust 280 from the second turbine 206 to an exterior of the aircraft 100. The second turbine 206, as described herein, is driven, at least in part, by an air flow from the cabin area 120 caused by a pressure differential between the second air inlet 202 and the second air outlet 204. The second turbine 206 may be in fluid communication with the second air outlet 204 through the heat exchanger 210. For example, the outlet 255 of the second turbine 206 is coupled to a second heat exchanger inlet 256 of the heat exchanger 210 in any suitable manner, such as through conduits 232, 233. A second heat exchanger outlet 257 of the heat exchanger 210 is coupled to the second air outlet 204 in any suitable manner, such as through conduit 234, so as to place the second turbine 206 in fluid communication with the second air outlet 204.

Still referring to FIG. 2, the water separator 209 comprises a condensate conduit 240 coupled to an outlet of the second turbine 206 so as to inject moisture 241 into the outlet 255 of the second turbine 206 upstream of the heat exchanger 210. For example, a mixing chamber 220 maybe coupled to the conduits 232, 233 so that second turbine exhaust 280 from the second turbine 206 passes through the mixing chamber 220. The condensate conduit 240 may be coupled to the mixing chamber 220 so that the moisture 241 mixes with the air exhausted from the second turbine 206 to increase the moisture content of the air exhausted from the second turbine 206. Increasing the moisture content of the air exhausted from the second turbine 206 prior to the air entering the second heat exchanger inlet 256 may increase the heat transfer capacity of the heat exchanger 210. In another aspect, such as where the air exhausted from the second turbine is below the freezing temperature of water (i.e., 32° F. or 0° C.), the condensate conduit 242 (illustrated in FIG. 2 as dashed lines but may be substantially similar to condensate conduit 240) may be coupled to the conduit 234 at or downstream of the second heat exchanger outlet 257 so as to substantially prevent solid particles (such as ice crystals) from entering the heat exchanger 210. In one aspect, the air exhausted from the second turbine 206 is above the freezing temperature of water (i.e., 32° F. or 0° C.) so as to substantially prevent formation of solid particles such as ice crystals upstream of the heat exchanger 210. In other aspects, where the air exhausted from the second turbine is below the freezing temperature of water (i.e., 32° F. or 0° C.), an air-particle separator 265 may be disposed between the outlet 255 of the second turbine 206 and the second heat exchanger inlet 256 of the heat exchanger 210, such as in or coupled to the conduit(s) 232, 233. The air-particle separator 265 may be any suitable separating device (e.g., such as a cyclonic separator) configured to remove any solid particles 266 (such as ice crystals) from the air exhausted from the second turbine 206.

The second turbine 206 is operably coupled to the compressor 207 and the first turbine 205 by a drive mechanism 211, such as a drive shaft 213, so that rotation of the second turbine 206 drives rotation of the compressor 207 and the first turbine 205. In one aspect, the second turbine 206 may be coupled to the drive mechanism 211 through a first transmission 214. The first transmission 214 may be any suitable transmission (e.g., gear box, clutched gear box, belt and pulleys, etc.). For example, each of the compressor 207, the first turbine 205, and the second turbine 206 are coupled to the drive mechanism 211 so that they rotate about a rotation axis 270 of the drive mechanism 211 as a single unit. The electric motor 208 may be coupled to the drive mechanism 211 in any suitable manner, such as through a second transmission 212. The second transmission may be any suitable transmission (e.g., gear box, clutched gear box, belt and pulleys, etc.). For example, the second transmission 212 may couple the electric motor 208 to the drive shaft 213. While the electric motor 208 and second turbine 206 are illustrated in FIG. 2 as being substantially in-line with the rotation axis 270 of the drive mechanism 211 (e.g., so as to directly drive the drive mechanism 211), in other aspects the electric motor 208 and second turbine 206 may be offset from the rotation axis 270 for driving the drive mechanism 211 through the respective first transmission 214 and second transmission 212.

Referring to FIGS. 1 and 2, and for exemplary purposes only, the air pressure within the cabin area 120, including the crown area 130 and the passenger seating area 120P may be about 12 pounds per square inch absolute (PSIA) (e.g., about 83 kilo-Pascal (kPa)) at a temperature of about 75° F. (e.g., about 24° C.), but may be any desired pressure and temperature that is comfortable for passengers of the aircraft 100. At a cruise altitude of about 35,000 feet (ft) (e.g., about 10,600 meters (m)) to about 40,000 ft (e.g., about 12,200 m), an air pressure exterior to the aircraft 100 may be about 3 PSIA (e.g., 21 kPa), but may vary depending on the cruise altitude. The moist air 350 present in the crown area 130 of the aircraft 100 may have a moisture content of more than about 10 grains of water per pound (gr/lb) of air (e.g., about 1.4 grams per kilogram of air (g/kg)). The dry air 360 produced by the air drying system may have a moisture content of about 10 gr/lb (e.g., about 1.4 g/kg) of air or less with a temperature of about the freezing point of water (e.g., about 32° F. or about 0° C.) to about zero degrees Fahrenheit (e.g., about −18° C.). In one aspect, the dry air 360 may have a moisture content of about 6 gr/lb (e.g., about 0.8 g/kg) of air or less, while in another aspect the moisture content may be about 4 gr/lb (e.g., about 0.6 g/kg) of air or less.

As described herein, the second turbine 206 is driven, at least in part, by a flow of air caused by a pressure differential between the second air inlet 202 and the second air outlet 204. As an example, the air at the second air inlet is at about 12 PSIA (e.g., about 83 kPa) and the air at the second air outlet is at about 3 PSIA (e.g., about 21 kPa), so that the pressure differential is about 9 PSIA (e.g., about 62 kPa). In other aspects, the pressure differential for driving the second turbine 206, at least in part, may be more or less than about 9 PSIA (e.g., about 62 kPa). The second turbine 206 may also be driven (e.g., an amount of energy for driving the second turbine 206 may be reduced), at least in part, from energy recovered by the first turbine 205. For example, a pressure differential exists between the outlet 251 of the compressor 207 and the first air outlet 203, which causes air to flow from the compressor 207 towards the first air outlet 203. The pressure at the outlet 251 of the compressor may be about 60 PSIA (e.g., about 414 kPa), and as noted above, the pressure at the first air outlet is about 12 PSIA (e.g., about 83 kPa), such that the pressure differential between the outlet 251 of the compressor 207 and the first air outlet 203 in this example is about 48 PSIA (e.g., about 331 kPa). The first turbine 205 is, at least in part, driven by the air flow pressure differential between the outlet 251 of the compressor 207 and the first air outlet 203, so that the compressor is driven, at least in part, from energy recovered from an air drying process of the air drying system. Here the first turbine 205 forms an energy recovery system that uses the pressure differential across the first turbine 205 to drive rotation of the compressor 207 and reduce the energy needed to drive the second turbine 206. The energy recovered by the first turbine 205 may allow for the operation of the air drying system 200 at a lower pressure differential between the second air inlet 202 and the second air outlet 204 when compared to operation of the air drying system 200 without the energy recovered by the first turbine 205.

Still referring to FIGS. 1 and 2, as described herein, the electric motor 208 is coupled to the drive mechanism 211 so as to drive rotation of the compressor 207, the first turbine 205, and the second turbine 206 when the pressure differential between the second air inlet 202 and the second air outlet 204 is insufficient to drive the second turbine, such as during ground operations of the aircraft 100, during ascent, and/or during descent. The electric motor 208 may be under control of any suitable controller of the aircraft and in one aspect, the air drying system 200 may include controller 295 that includes any suitable non-transitory computer program code for driving the electric motor 208 as described herein. For example, the controller 295 may be configured to drive the electric motor 208 so that the electric motor provides varying torque for driving the drive mechanism 211. The varying torque may be based on the pressure differential between the second air inlet 202 and the second air outlet 204 as determined by any suitable first pressure sensor(s) 297 disposed at, or adjacent, to the second air outlet 204 and any suitable second pressure sensor(s) 298 at, or adjacent, the second air inlet 202 or at any suitable location within the cabin area 120. As the pressure differential between the second air inlet 202 and the second air outlet 204 increases, less torque is applied by the electric motor 208 to the drive mechanism 211 where, at cruise altitudes, the compressor 207 and the first turbine 205 may be driven solely by the second turbine 206.

Referring to FIGS. 1, 2, 3, and 4, an exemplary method for drying air is provided using the air drying system 200. As described above, the second turbine 206 is driven, at least in part, with an air flow caused by the pressure differential (FIG. 4, Block 402) between the second air inlet 202 and the second air outlet 204. Rotation of the compressor 207 and the first turbine 205 is driven, at least in part, through the drive mechanism 211 which is rotated/driven by the second turbine 206 (FIG. 4, Block 403). The rotation of the compressor 207, first turbine 205, and second turbine 206 may be driven by the electric motor 208 (FIG. 4, Block 408) until, for example, the pressure differential between the second air inlet 202 and the second air outlet 204 is sufficient to maintain rotation of the second turbine 206 (which drives rotation of the compressor 207 and the first turbine 205) substantially without assistance from the electric motor 208. Here, the mechanical input of the electric motor 208 for driving the rotating components of the air drying system 200 may be decreased as the pressure differential between the the second air inlet 202 and the second air outlet 204 increases. For example, as noted above, at cruise altitudes, the pressure differential between the second air inlet 202 and the second air outlet 204 may provide all (or nearly all) the energy for driving rotation of the second turbine 206 for the production of the dry air 360 substantially without or without input from the electric motor 208.

Rotation of the compressor 207 draws moist air 350 through the first air inlet 201 so that the moist air 350 is received into the compressor 207 (FIG. 4, Block 400). The compressor 207 compresses the moist air 350 to, for example, about 60 PSIA (e.g., about 414 kPa) where compressed moist air is exhausted as compressor exhaust 281 from the compressor 207 and a temperature of the moist air is increased from the compression. The temperature of the compressor exhaust 281 is reduced (and water is condensed in the compressor exhaust 281 upstream from the first turbine 205) with the heat exchanger 210 upstream of the first turbine (FIG. 4, Block 405). To reduce the temperature of (and condense the water in) the compressor exhaust 281, the air from the second turbine 206 (e.g., second turbine exhaust 280) is passed through the heat exchanger 210, between the second heat exchanger inlet 256 and the second heat exchanger outlet 257, so that heat is transferred from the compressor exhaust 281 flowing through the heat exchanger 210, between the first heat exchanger inlet 250 and the first heat exchanger outlet 252. The heat exchanger 210 condenses water in the compressor exhaust 281 upstream from the first turbine 205 so that the water may be removed from the compressor exhaust 281 (e.g., with greater efficiency when compared to warmer compressor exhaust) by the water separator 209.

In one aspect, condensate from the water separator 209 may be drained to an outlet 255 of the second turbine 206 so as to inject moisture 241 into the outlet 255 of the second turbine 206 (e.g., into the second turbine exhaust 280) (FIG. 4, Block 404) upstream of the heat exchanger 210. For example, in one aspect, moisture 241 from the water separator 209 may be injected or otherwise mixed with the second turbine exhaust 280 upstream of the heat exchanger 210 to increase an amount of heat transfer that occurs through the heat exchanger 210. In other aspects, condensate from the water separator 209 may be injected into the second turbine exhaust 280 downstream of the heat exchanger 210. A temperature of the second turbine exhaust 280 is increased through the heat exchanger 210 so that the temperature of the second turbine exhaust 280 is above the freezing point of water so that ice (e.g., solid particle) formation may be prevented (or reduced) as the second turbine exhaust 280 exits to the exterior of the aircraft 100 through the second air outlet 204. As described herein, solid particles may be separated from the second turbine exhaust 280 with an air-particle separator 265 and/or a heater 267 disposed between the second turbine 206 and the heat exchanger 210.

Moisture is separated from the compressor exhaust 281 with the water separator 209 that is disposed between the heat exchanger 210 and the first turbine 205 (FIG. 4, Block 406). The amount of moisture 241 separated from the compressor exhaust 281 may be dependent on the pressure and temperature of the compressor exhaust 281 as it enters the water separator 209. In accordance with the examples provided above, the temperature and pressure of the compressor exhaust 281 may be such that the resulting dry air 360 has the moisture content described above. A temperature of the compressor exhaust 281 may be further decreased as the compressor exhaust 281 is passed through the water separator 209. The air flow of the dried compressor exhaust 281 passes through and, at least in part, drives rotation of the first turbine 205 due to, for example, the pressure differential (FIG. 4, Block 407) that exists between the compressor outlet 251 and the first air outlet 203. The first turbine 205 expands the air flow of dried air and further cools the temperature of the dry air so that the dry air 360 is expelled from the first turbine 205 (FIG. 4, Block 401) through the first air outlet 203. As described herein the dry air 360 has a pressure of about 12 PSIA (e.g., about 83 kPa) and a temperature from about 32° F. (e.g., 0° C.) to about 0° F. (e.g., about −18° C.).

As can be seen in FIG. 3, the first air outlet 203 may be in the form of an air injector that injects the dry air 360 into the insulative area 300 of the aircraft 100. For example, the insulative area 300 of the aircraft may be formed by the inner surface 311 of the exterior skin 310 and a cover 330 disposed adjacent the inner surface 311. The insulative area 300 includes aircraft insulation 320 that is disposed adjacent the inner surface 311 of the exterior skin 310. The cover 330 may be any suitable covering, such as for example a non-metallic covering, that is disposed over the aircraft insulation 320 so that the aircraft insulation 320 is disposed between the inner surface 311 of the exterior skin 310 and the cover 330. The cover 330 may be configured to contain at least some of the condensation that may form on the inner surface 311 of the exterior skin 310 and/or on the aircraft insulation 320. The first air outlet 203 may be disposed relative to the aircraft insulation 320 and the inner surface 311 so that the dry air 360 is injected between the inner surface 311 and the aircraft insulation 320. The injected dry air 360 may displace and/or dry at least some of the moisture that may exist in the insulative area 300. The temperature of the dry air 360 expelled by the first turbine 205 may be such that the temperature substantially matches a temperature of at least the inner surface 311 of the exterior skin 310 which may prevent the formation of condensation when the dry air 360 impinges upon or otherwise contacts the inner surface 311.

The following examples are provided in accordance with the aspects of the present disclosure:

A1. An air drying system comprising:
a compressor coupled to a first air inlet through which moist air is received;
a first turbine in fluid communication with the compressor and coupled to a first air outlet through which dry air is expelled; and
a second turbine coupled to a second air inlet and a second air outlet and being driven, at least in part, by an air flow caused by a pressure differential between the second air inlet and the second air outlet;
wherein the second turbine is operably coupled to the compressor and the first turbine by a drive mechanism so that rotation of the second turbine drives rotation of the compressor and the first turbine.

A2. The air drying system of paragraph A1, further comprising:
a heat exchanger having a first heat exchanger inlet coupled to an outlet of the compressor; and
a water separator coupled to a first heat exchange outlet of the heat exchanger and to an inlet of the first turbine.

A3. The air drying system of paragraph A2, wherein:
an outlet of the second turbine is coupled to a second heat exchanger inlet of the heat exchanger; and
a second heat exchanger outlet of the heat exchanger is coupled to the second air outlet.

A4. The air drying system of paragraph A3, wherein the water separator comprises a condensate conduit coupled to an outlet of the second turbine so as to inject moisture into the outlet of the second turbine upstream or downstream of the heat exchanger.

A5. The air drying system of paragraph A3, further comprising an air-particle separator disposed between the outlet of the second turbine and the second heat exchanger inlet of the heat exchanger.

A6. The air drying system of paragraph A3, wherein the water separator comprises a condensate conduit coupled to the second heat exchanger outlet of the heat exchanger.

A7. The air drying system of paragraph A1, wherein first turbine is, at least in part, driven by an air flow pressure differential between an outlet of the compressor and the first air outlet.

A8. The air drying system of paragraph A1, further comprising an electric motor coupled to the drive mechanism.

A9. The air drying system of paragraph A8, wherein the electric motor is configured to drive the compressor, the first turbine, and the second turbine when the pressure differential between the second air inlet and the second air outlet is insufficient to drive the second turbine.

A10. The air drying system of paragraph A1, wherein a second turbine exhaust of the second turbine is at a temperature above a freezing point of water.

A11. The air drying system of paragraph A1, wherein the dry air comprises air having about 10 grains or less of water per pound of air.

A12. The air drying system of paragraph A1, wherein the dry air comprises air having about 6 grains or less of water per pound of air.

A13. The air drying system of paragraph A1, wherein the dry air comprises a temperature of about a freezing point of water to about zero degrees Fahrenheit.

A14. The air drying system of paragraph A1, wherein the moist air comprises air having more than about 10 grains of water per pound of air.

B1. An aircraft comprising:
a frame forming a cabin area including a crown area and an insulative area, the insulative area being disposed at least between the crown area and an exterior skin coupled to the frame; and
an air drying system coupled to the frame, the air drying system including
a compressor having an inlet coupled to a first air inlet disposed so as to receive moist air from the crown area;
a first turbine in fluid communication with the compressor and coupled to a first air outlet through which dry air is expelled into one or more of the crown area and insulative area; and
a second turbine coupled to a second air inlet and a second air outlet, the second air inlet being disposed so as to receive air from the cabin area and the second air outlet being disposed so as to expel air to an exterior of the aircraft, the second turbine being driven, at least in part, by an air flow caused by a pressure differential between the second air inlet and the second air outlet;
wherein the second turbine is operably coupled to the compressor and the first turbine by a drive mechanism so that rotation of the second turbine drives rotation of the compressor and the first turbine.

B2. The aircraft of paragraph B1, further comprising:
a heat exchanger coupled to the frame and having a first heat exchanger inlet coupled to an outlet of the compressor; and
a water separator coupled to a first heat exchange outlet of the heat exchanger and to an inlet of the first turbine.

B3. The aircraft of paragraph B2, wherein:
an outlet of the second turbine is coupled to a second heat exchanger inlet of the heat exchanger; and
a second heat exchanger outlet of the heat exchanger is coupled to the second air outlet.

B4. The aircraft of paragraph B3, wherein the water separator comprises a condensate conduit coupled to an outlet of the second turbine so as to inject moisture into the outlet of the second turbine upstream or downstream of the heat exchanger.

B5. The aircraft of paragraph B3, further comprising an air-particle separator disposed between the outlet of the second turbine and the second heat exchanger inlet of the heat exchanger.

B6. The aircraft of paragraph B3, wherein the water separator comprises a condensate conduit coupled to the second heat exchanger outlet of the heat exchanger.

B7. The aircraft of paragraph B1, wherein first turbine is, at least in part, driven by an air flow pressure differential between an outlet of the compressor and the first air outlet.

B8. The aircraft of paragraph B1, further comprising an electric motor coupled to the drive mechanism.

B9. The aircraft of paragraph B8, wherein the electric motor is configured to drive the compressor, the first turbine, and the second turbine when the pressure differential between the second air inlet and the second air outlet is insufficient to drive the second turbine.

B10. The aircraft of paragraph B1, wherein a second turbine exhaust of the second turbine is at a temperature above a freezing point of water.

B11. The aircraft of paragraph B1, wherein the dry air comprises air having about 10 grains or less of water per pound of air.

B12. The aircraft of paragraph B1, wherein the dry air comprises air having about 6 grains or less of water per pound of air.

B13. The aircraft of paragraph B1, wherein the dry air comprises a temperature of about a freezing point of water to about zero degrees Fahrenheit.

B14. The aircraft of paragraph B1, wherein the moist air comprises air having more than about 10 grains of water per pound of air.

C1. A method for drying air, the method comprising:

receiving, through a first air inlet, moist air into a compressor;

expelling dry air from a first turbine, through a first air outlet, where the first turbine is in fluid communication with the compressor;

driving, at least in part, a second turbine with an air flow caused by a pressure differential between a second air inlet and a second air outlet, the second air inlet and the second air outlet being coupled to the second turbine; and driving, at least in part, through a drive mechanism, rotation of the compressor and the first turbine with rotation of the second turbine.

C2. The method of paragraph C1, further comprising:

reducing a temperature of compressor exhaust from the compressor, with a heat exchanger, upstream of the first turbine; and separating, moisture from the compressor exhaust, with a water separator, between the heat exchanger and the first turbine.

C3. The method of paragraph C2, further comprising draining condensate from the water separator to an outlet of the second turbine so as to inject moisture into the outlet of the second turbine upstream or downstream of the heat exchanger.

C4. The method of paragraph C3, further comprising separating solid particles from second turbine exhaust with an air-particle separator disposed between the second turbine and the heat exchanger.

C5. The method of paragraph C2, further comprising draining condensate from the water separator downstream of the heat exchanger.

C6. The method of paragraph C1, further comprising driving the first turbine, at least in part, with an air flow pressure differential between an outlet of the compressor and the first air outlet.

C7. The method of paragraph C1, further comprising driving the compressor, the first turbine, and the second turbine, with an electric motor, when the pressure differential between the second air inlet and the second air outlet is insufficient to drive the second turbine.

C8. The method of paragraph C1, wherein second turbine exhaust of the second turbine is at a temperature above a freezing point of water.

C9. The method of paragraph C1, wherein the dry air comprises air having about 10 grains or less of water per pound of air.

C10. The method of paragraph C1, wherein the dry air comprises air having about 6 grains or less of water per pound of air.

C11. The method of paragraph C1, wherein the dry air comprises a temperature of about a freezing point of water to about zero degrees Fahrenheit.

C12. The method of paragraph C1, wherein the moist air comprises air having more than about 10 grains of water per pound of air.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIG. 4, referred to above, the blocks may represent operations and/or portions thereof and lines connecting the various blocks do not imply any particular order or dependency of the operations or portions thereof. Blocks represented by dashed lines, if any, indicate alternative operations and/or portions thereof. Dashed lines, if any, connecting the various blocks represent alternative dependencies of the operations or portions thereof. It will be understood that not all dependencies among the various disclosed operations are necessarily represented. FIG. 4 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or substantially simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es), system(s), and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. An air drying system comprising:
    a compressor coupled to a first air inlet through which moist air is received;
    a first turbine in fluid communication with the compressor and coupled to a first air outlet through which dry air is expelled; and
    a second turbine coupled to a second air inlet and a second air outlet and being driven, at least in part, by an air flow caused by a pressure differential between the second air inlet and the second air outlet;
    wherein:
        the second turbine is operably coupled to the compressor and the first turbine by a drive mechanism so that rotation of the second turbine, effected by the pressure differential, drives rotation of the compressor and the first turbine so that the dry air is expelled from the first turbine through the first air outlet,
        all dry air expelled from the first air outlet and generated from the moist air passes through the first turbine regardless of the pressure differential between the second air inlet and the second air outlet,
        a first fluid passageway is formed between the first air inlet and the first air outlet, and
        a second fluid passageway is formed between the second air inlet and the second air outlet, the second fluid passageway being distinct from the first fluid passageway regardless of the pressure differential between the second air inlet and the second air outlet.

2. The air drying system of claim 1, further comprising:
    a heat exchanger having a first heat exchanger inlet coupled to an outlet of the compressor; and
    a water separator coupled to a first heat exchanger outlet of the heat exchanger and to an inlet of the first turbine.

3. The air drying system of claim 2, wherein:
    an outlet of the second turbine is coupled to a second heat exchanger inlet of the heat exchanger; and
    a second heat exchanger outlet of the heat exchanger is coupled to the second air outlet.

4. The air drying system of claim 3, wherein the water separator comprises a condensate conduit coupled to an outlet of the second turbine so as to inject moisture into the outlet of the second turbine upstream or downstream of the heat exchanger.

5. The air drying system of claim 1, wherein the first turbine is, at least in part, driven by an air flow pressure differential between an outlet of the compressor and the first air outlet.

6. The air drying system of claim 1, further comprising an electric motor coupled to the drive mechanism.

7. The air drying system of claim 1, wherein the dry air comprises air having about 10 grains or less of water per pound of air.

8. The air drying system of claim 1, wherein the dry air comprises a temperature of about a freezing point of water to about zero degrees Fahrenheit.

9. The air drying system of claim 3, further comprising an air-particle separator disposed between the outlet of the second turbine and the second heat exchanger inlet of the heat exchanger.

10. The air drying system of claim 6, wherein the electric motor is configured to drive the compressor, the first turbine, and the second turbine when the pressure differential between the second air inlet and the second air outlet is insufficient to drive the second turbine.

11. An air drying system for an aircraft interior, the air drying system comprising:
  a compressor coupled to a first air inlet through which moist air is received;
  a first turbine in fluid communication with the compressor and coupled to a first air outlet through which dry air is expelled;
  a second turbine coupled to a second air inlet and a second air outlet and being driven, at least in part, by an air flow caused by a pressure differential between the second air inlet and the second air outlet;
  a drive mechanism that couples the second turbine to the compressor and the first turbine so that rotation of the second turbine drives rotation of the compressor and the first turbine;
  an electric motor coupled to the drive mechanism, wherein the electric motor is configured to drive the compressor, the first turbine, and the second turbine when the pressure differential between the second air inlet and the second air outlet is insufficient to drive the second turbine; and
  a controller coupled to the electric motor and configured to drive the electric motor so that the electric motor provides varying torque for driving the drive mechanism, wherein the varying toque depends on the pressure differential.

12. The air drying system of claim 11, further comprising:
  a heat exchanger having a first heat exchanger inlet coupled to an outlet of the compressor; and
  a water separator coupled to a first heat exchanger outlet of the heat exchanger and to an inlet of the first turbine.

13. The air drying system of claim 12, wherein:
  an outlet of the second turbine is coupled to a second heat exchanger inlet of the heat exchanger; and
  a second heat exchanger outlet of the heat exchanger is coupled to the second air outlet.

14. The air drying system of claim 13, wherein the water separator comprises a condensate conduit coupled to an outlet of the second turbine so as to inject moisture into the outlet of the second turbine upstream or downstream of the heat exchanger.

15. The air drying system of claim 13, further comprising an air-particle separator disposed between the outlet of the second turbine and the second heat exchanger inlet of the heat exchanger.

16. The air drying system of claim 11, wherein the first turbine is, at least in part, driven by an air flow pressure differential between an outlet of the compressor and the first air outlet.

17. The air drying system of claim 11, wherein the dry air comprises air having about 10 grains or less of water per pound of air.

18. The air drying system of claim 11, wherein the dry air comprises a temperature of about a freezing point of water to about zero degrees Fahrenheit.

19. The air drying system of claim 11, wherein the first air inlet is communicably coupled to a crown area of the aircraft.

20. The air drying system of claim 11, wherein the second air inlet is communicably coupled to a cabin area of the aircraft.

* * * * *